United States Patent
Zheng et al.

(10) Patent No.: US 7,089,651 B2
(45) Date of Patent: Aug. 15, 2006

(54) PROCESS OF MANUFACTURING COIL LAYERS USING A NOVEL COMBINATION OF PHOTOEXPOSURE AND THERMAL CURING TO ACHIEVE SHAPE CONTROL OF A PHOTORESIST MATERIAL

(75) Inventors: Yi Zheng, San Ramon, CA (US); Yi-Chun Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 172 days.

(21) Appl. No.: 09/971,277

(22) Filed: Oct. 5, 2001

(65) Prior Publication Data
US 2003/0067713 A1    Apr. 10, 2003

(51) Int. Cl.
*G11B 5/17*    (2006.01)
*G03F 7/00*    (2006.01)

(52) U.S. Cl. ............... 29/603.24; 29/603.23; 29/603.25; 29/603.08; 29/606; 430/320; 430/313; 360/122; 360/123

(58) Field of Classification Search ............ 29/603.24, 29/603.23, 603.25, 603.07, 603.08, 606; 430/320, 312, 313, 270.1; 360/122, 123; 427/240
See application file for complete search history.

(56) References Cited

U.S. PATENT DOCUMENTS

| | | | | |
|---|---|---|---|---|
| 4,158,566 A | * | 6/1979 | Goldman | 430/270.1 X |
| 4,841,624 A | * | 6/1989 | Togawa et al. | 29/603.25 X |
| 5,926,349 A | | 7/1999 | Krounbi et al. | 360/113 |
| 6,024,886 A | | 2/2000 | Han et al. | 216/38 |
| 6,105,238 A | | 8/2000 | Chesnutt et al. | 29/603.14 |
| 6,106,995 A | * | 8/2000 | Dixit et al. | 430/270.1 |
| 6,111,724 A | | 8/2000 | Santini | 360/126 |
| 6,151,193 A | | 11/2000 | Terunuma et al. | 360/126 |
| 6,158,107 A | | 12/2000 | Chang et al. | 29/603.14 |

FOREIGN PATENT DOCUMENTS

JP        63-285716    * 11/1998

* cited by examiner

*Primary Examiner*—A. Dexter Tugbang
(74) *Attorney, Agent, or Firm*—Saile Ackerman LLC; Stephen B. Ackerman

(57) ABSTRACT

A method for forming at least two layers of electrical coils and their supportive resistive layers for a magnetic write head having an ultra-short yoke so that the second and any additional coil layers are formed on flat resistive surfaces to eliminate problems associated with inter- and intra-layer shorting and with shorting between coil and yoke. The resistive layers are formed with flat surfaces and desired apex angles by using a novel two-step photoresist scheme in which a layer of photoresist is first photoexposed and developed, then photoexposed a second time to cure a surface region that will remain flat during a final low temperature curing process.

9 Claims, 3 Drawing Sheets

PROCESS OF MANUFACTURING COIL LAYERS USING A NOVEL COMBINATION OF PHOTOEXPOSURE AND THERMAL CURING TO ACHIEVE SHAPE CONTROL OF A PHOTORESIST MATERIAL

BACKGROUND OF THE INVENTION

1. Field of the Invention

This invention relates generally to the fabrication of a thin film magnetic write head and more particularly to the use of a novel photoresist process that permits an improved fabrication process for such heads having ultra-short yokes.

2. Description of the Related Art

The size reduction of yoke length (YL) in thin film head (TFH) magnetic write heads to lengths less than 15 microns (μm) has necessitated the development of methods for obtaining flat insulator topographies. The short YL insulator resist imaging process currently used in the TFH fabrication industry results in a convex shape after thermal hardbake of the resist (FIG. 1). This shape is highly disadvantageous for the formation of a second magnetic coil layer and not only makes such second coil formation nearly impossible but also causes electrical shorting between the turns and between the turns and the magnetic pole yoke, leading to poor yields in terms of resistance and inductance values. Given that there will be a trend to higher insulator surface tensions as a result of the necessity of fabricating increasingly smaller yoke structures, the problems associated with dome-shaped insulators need to be resolved.

Chang et al. (U.S. Pat. No. 6,158,107) teach a method of fabricating a write head in which a second pole tip layer is plated over a write gap layer and a first tip layer within a soft-baked photoresist plating frame. The photoresist plating frame allows the gap layer and second tip layer to be self aligned with the first tip layer. The method of Chang et al., however, does not specifically teach how to form a photoresist layer that defines the insulated coil structures that are formed beneath the upper yoke. Neither does the method of Chang et al. disclose an ultra-short yoke. In fact, Chang et al. speak only of forming a second coil over a lapped surface. Krounbi et al. (U.S. Pat. No. 5,926,349) teach a method of forming a merged magnetoresistive (MR) head in which a double resistive layer is soft-baked over a single coil layer and then hard-baked for smoothness. The method neither teaches a second coil formation over the first, nor does it teach the formation of an ultra-short yoke. Chesnutt et al. (U.S. Pat. No. 6,105,238) teach a method for forming a write head structure in which any number of coil layers are allowed. They show, in particular, a two coil structure in which a first coil layer is covered by a first coil insulator (203 in their FIG. 2) that comprises, for example, a cured photoresist which can be an AZ4000 series positive photoresist. A second coil layer is then formed on this cured photoresist layer. Chesnutt et al. do not teach this method in the context of an ultra-short yoke, in fact they do not indicate the length of their yoke.

Terunuma et al (U.S. Pat. No. 6,151,193) teach a method of forming a magnetic write head in which a coil structure is formed on a flat, non-magnetic insulating film. They state that the coil film and its supporting insulating film can be formed on the flattened non-magnetic insulating film so as to eliminate disconnection and shorting of the coil film. Terunuma et al. do not disclose the length of the yoke structure, nor do they indicate the surface shape of the coil insulating film on which they would form a second coil layer.

Han et al. (U.S. Pat. No. 6,024,886) teach a method of forming a magnetic write head in which a flat surface is formed by means of a planarized, backfilling insulator layer. A single coil layer is formed on this planarized layer and then covered by a photoresist layer. Han et al. do not teach the formation of a second coil layer over the photoresist surface that covers the first coil layer, so it is not known what the surface shape of this layer is or what effect it would have on the formation of subsequent coil layers, if any. In addition, Han et al. do not disclose the yoke dimensions of their write head, so it is not known if it is an ultra-short write head, Santini (U.S. Pat. No. 6,111,724) teaches a method of forming a magnetic write head with a novel pole tip structure by using a positive photoresist photopatterned over a negative resist layer. Although primarily teaching the tip formation, Santini also teaches the formation of a double coil layer and the insulation layer within which it is formed. The teaching does not indicate the method by which the second coil is formed over the surface of the insulation layer covering the first coil, nor does it indicate the length of the coil region.

As has already been pointed out, new problems with insulation layers and multiple coil layers arise in the context of ultra-short yoke lengths. In these cases, the surface tension of the photoresist layer that forms the insulation layer produces a convex surface on which it is extremely difficult to form a second coil layer. The prior art cited above does not address ultra-short yoke length fabrications and is, therefore, silent on the issue of photoresist surfaces and coil formation under those conditions. What is needed, therefore, is a method of forming a resistive layer for an ultra-short yoke fabrication wherein the surface of the layer is flat in the region of coil formation and yet the layer achieves a desired apex angle.

SUMMARY OF THE INVENTION

A first object of this invention is to provide a method for forming coil insulation layers and multiple coil layers for magnetic write heads having ultra-short yoke lengths in the range of 15 μm and below.

A second object of this invention is to provide a method for forming coil insulation layers and multiple coil layers for magnetic write heads having ultra-short yoke lengths in the range of 15 μm and below, wherein product yield is improved and problems associated with coil resistance, coil inductance and intra-and inter-coil shorting as well as coil to pole shorting are reduced or eliminated.

A third object of this invention is to provide a method for forming coil insulation layers and multiple coil layers for magnetic write heads having ultra-short yoke lengths in the range of 15 μm and below, wherein it does not become necessary to reduce coil pitch and wherein a smaller yoke length (YL) can be achieved and a desired apex angle maintained.

A fourth object of this invention is to provide such a method wherein coil insulation layers are efficiently and cost-effectively formed using commercially available photoresist mediums.

In accord with the objects of this invention there is provided a method of forming a photoresist medium such as JSR JMH1001 into a resistive layer having a flat surface and desired apex angle by use of a novel 2-step exposure method in which the insulator shape is first defined by a photo patterning process, then is developed and subjected to a second I-line stepper exposure over a region that does not include the apex angle, and said resist medium is then subjected to a low temperature curing process. The region subjected to the second I-line exposure process is fixed in shape during the subsequent curing process, leaving a resist shape with a flat upper surface and properly sloping apex angle.

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying figures, wherein:

FIG. 1a is an artist's rendering of a photomicrograph taken of an actual cross-section of an ultra-short yoke read head having two layers of coil formation and their associated insulation layers, as produced by methods of the prior art.

FIG'S. 2a, b, c and d are schematic drawings of first and second coil formations and their respective insulation layers as produced by the prior art (a, c) and by the method of the present invention (b, d).

FIG'S. 3a, b, c and d are schematic depictions of the process flow required to produce the insulation shapes in accord with the objects of the present invention.

DESCRIPTION OF THE PREFERRED EMBODIMENTS

The present invention provides a method for forming coil structures and their resistive and support layers for an ultra-short yoke magnetic write head.

Figure 1B:
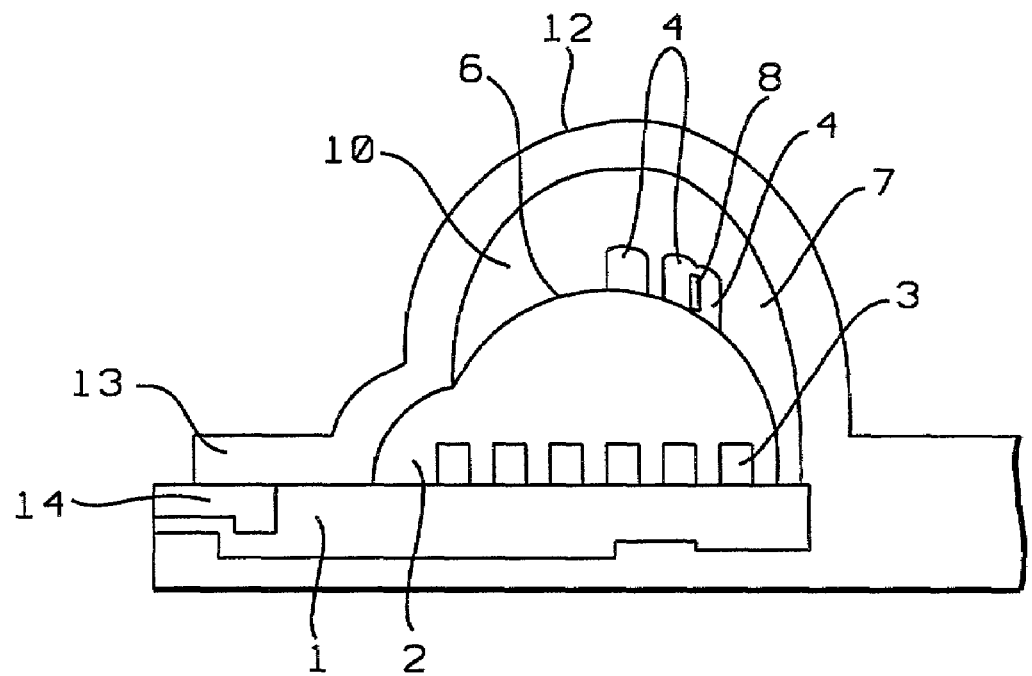
FIG. 1b is an artists rendering of a photomicrograph taken of an actual cross-section of an ultra-short yoke read head having two layers of coil formation and their associated insulation layers, as produced by methods of the present invention.
Figure 1B:
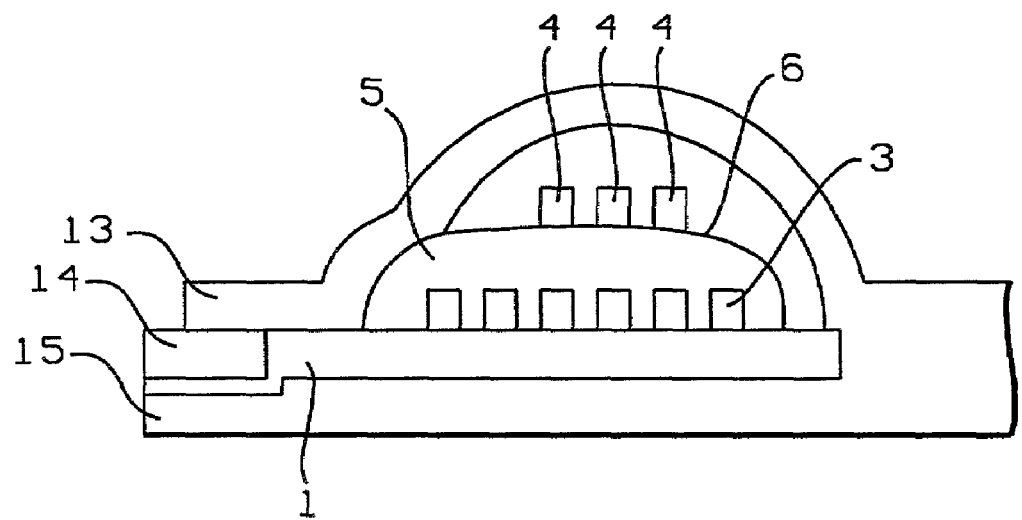

Referring first to FIG. 1 there is shown an artists rendering (for clarity of reproduction) of a photomicro graph of a cross-section through an ultra-short yoke magnetic write head formed by the methods of the prior art in which there is only a single hardbake of each insulating layer. A first coil layer (3) has been formed on an alumina ($Al_2O_3$) layer (1). A first layer of insulation (5) has been formed over the first coil layer by the prior art method, producing a convex upper surface (6) as a result of the hardbake. While a desired apex angle (2) has been obtained, the second coil layer (4) has been formed on the extremely convex surface (6) of the insulating layer of the first coil formation (5). As can also be seen, the necessity of forming the second coil layer (4) on such a convex surface has produced a poor coil formation and shorting (8) between neighboring coil turns. A second insulation layer (10) has been formed over the second coil layer, said second insulation layer also having a convex surface (12). In an effort to shorten the yoke length, the region (7) between the second coil layer and the top surface of the second insulation layer can become thin enough to allow shorting between the coil and the second pole piece assembly, comprising an upper yoke (13) and attached upper write pole (14).

Referring next to FIG. 1b, there is again shown an artists rendering (for clarity) of a photomicrograph of a cross-section through an ultra-short yoke magnetic write head structure similar in structure to that if FIG. 1a, and also comprising two coil layers and their respective insulation layers, but in this case formed in accord with the method of the present invention. The first coil layer(3) is formed to a thickness of approximately 3.6 microns (but can be between approximately 3 and 4 microns and will depend on the overall device topology) and length between approximately 8 and 15 microns (again, depending on overall device topology) on an alumina insulating layer (1), which is itself formed on a bottom write pole (15). It is particularly to be noted that the second coil layer (4) is formed on a flat surface (6) of the insulating layer of the first coil formation (5). In contrast with the second coil layer of FIG. 1a, the second coil layer of FIG. 1b is perfectly formed and there is no evidence of inter-coil shorting. In addition, a short yoke length has been achieved without the necessity of reducing the distance between the second coil layer and the upper yoke. All of the advantages of the method of the present invention are a result of a second I-beam exposure which provides a surface-curing of those portions of the resist layer that are to remain flat. The second exposure surface-cures those photoresist regions and prevents their flow and convex surface formation during hardbake. The second coil layer is then covered by a second insulation layer and the resulting formation is finally covered by a second pole piece assembly, comprising a magnetic yoke (13) and lower pole piece (14), thereby forming a complete head assembly.

Referring next to FIG'S. 2a, b, c and d, there is shown a more schematic drawing of formations like those rendered more realistically in FIG'S. 1a and b. FIG. 2a shows a first coil layer (3) covered by a first insulation layer (7) as formed by the methods of the prior art. The surface (9) of the insulation layer is seen to be extremely convex.

Figure 2B:
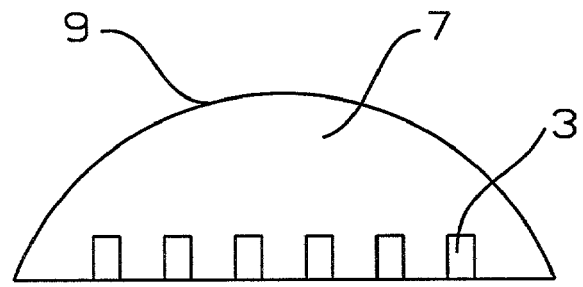
Figure 2B:
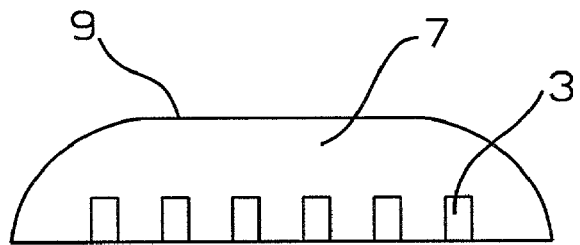

Referring next to FIG. 2b, there is shown an equivalent schematic drawing of a first coil and insulation layer formed in accord with the methods of the present invention. Of particular note is the flattened upper surface (9) of the insulation layer, which is a result of the second I-beam exposure.

Referring next to FIG. 2c, there is shown the prior art formation of FIG. 2a, wherein a second coil layer (10) has been formed on the convex surface (9) of the first insulation layer. A significant difference between this formation and that in FIG. 2d (below), is the extended distance (19) between the rear surfaces of the first and second insulator layers (the backgap). This makes the formation unnecessarily long, which is disadvantageous for the ultra-short fabrications being formed. If the backgap (19) is made thinner by the use of a shorter mask during the layer formation, then the thinner insulation layer will allow the possibility of shorting between the second coil layer (10) and an upper yoke (not shown) that will subsequently be formed over the insulation layer. Such a reduction of insulation thickness can be seen as (7) in FIG. 1a.

Figure 2D:
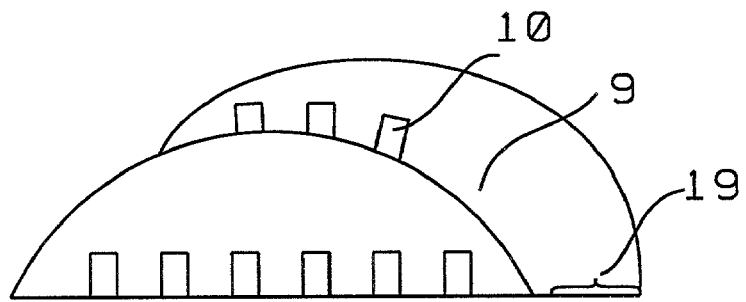
Figure 2D:
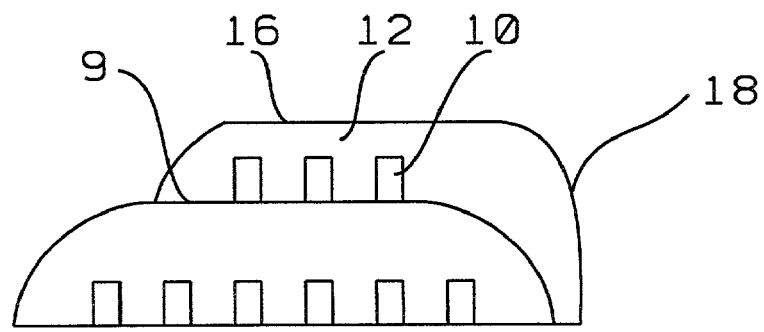

Referring finally to FIG. 2d, there is shown the formation of FIG. 1b, subsequent to the formation of a second coil layer (10) and its insulation layer (12). Two things are of note in this figure. First, the flattened upper surface (9) of the first insulation layer allows a uniform second coil formation. Second, the upper surface (16) of the second insulation layer (12) is flattened and its rear surface (18) descends steeply. These effects, which are both a result of the double exposure method of the present invention, allow the formation of a write head of significantly smaller yoke length dimensions yet avoid a thinning of the insulation layer and correspond-ing the possibility of coil-to-pole shorting.

Referring now to FIG'S. 3a–d, there is shown a schematic sequence of process steps by which the novel double exposure of the present invention is implemented and through whose use the structure of FIG. 1b was obtained.

Figure 3A:
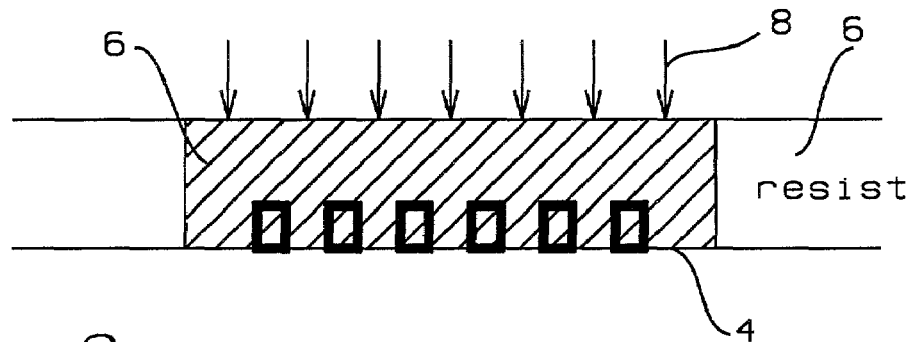

FIG. 3a is a schematic drawing showing the cross-section of a coil layer (2) which has been formed on a flat surface (4), which, for a first coil layer, would be an alumina insulator surface or, for a second coil layer, would be a first insulator surface previously formed by the method of the present invention. The coil layer has been covered by a layer of photoresist (6), which is shown being patterned (shaded area) through exposure by suitable dosage of radiation (8) through a first patterning mask. In accord with the method of the present invention as applied to a first coil layer, the photoresist can be patterned in the following steps (there are differences that will be noted if a second photoresist layer were being formed):

(1) Photo Patterning Process
   a) Spin coat JSR JMH1001 photoresist (or other I-beam sensitive photoresist) to a thickness of between approximately 3 microns and 4 microns (approximately 3.6 μm is used in the present embodiment but an alternative appropriate thickness may be based on device topographical requirements).
   b) Softbake photoresist at approximately 115° C. (a temperature between 110° and 135° may be appropriate), using a hotplate or other equivalent thermal source for approximately 360 sec., (a duration of between 330 sec. and 390 sec. is appropriate).
   c) Expose with Nikon I-line stepper or equivalent radiation source with a radiative energy of approximately 550 mJ.
   d) Develop with AZ 400K developer (or equivalent), using spray development.

If a second coil layer and its resist layer is to be processed by the method of the present invention, as would be the case in preparing the write head of FIG. 2, the second layer of photoresist would be formed to a greater thickness, typically between approximately 4.0 and 5.0 microns and the first I-line exposure energy of that second layer would be in the range of approximately 750 mJ, corresponding to the increased thickness.

Figure 3B:
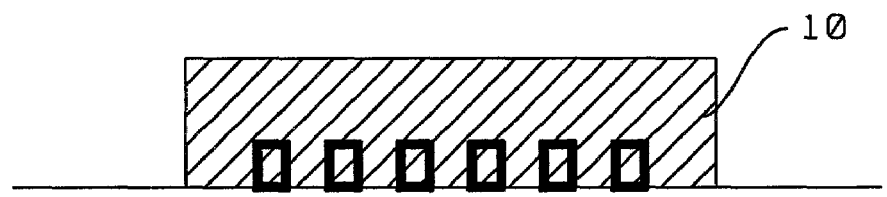

Referring next to FIG. 3b, there is seen the exposed portion of the photoresist (10) that remains after a developing process to remove unwanted photoresist.

Figure 3C:
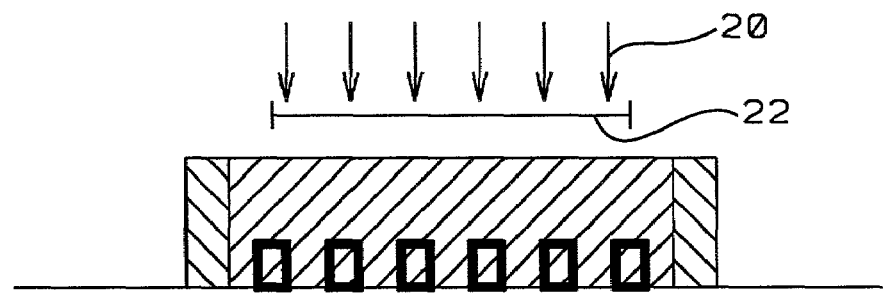

Referring next to FIG. 3c, there is shown the photoresist of FIG. 3b now being subjected to a second exposure (20) through a second patterning mask (22) in accord with the following steps:

(2) Second Exposure
   a) Using second mask (22), expose resist to new photo pattern again with Nikon I-line stepper, at 100 mJ.
   b) The second mask (22) is designed to allow the desired flat area (20) on which the coil layer will be formed to be exposed by the I-beam stepper, while the apex angle region (23) remains unexposed.
   c) This second exposure surface-cures the JMH1001 resist and allows the insulator top shape to remain unchanged (flat) during the resist curing step that follows.
   d) In the case of a second exposure of a second photoresist layer, the surface curing allows the uncured portion to slope steeply on its rear surface portion.

Figure 3D:
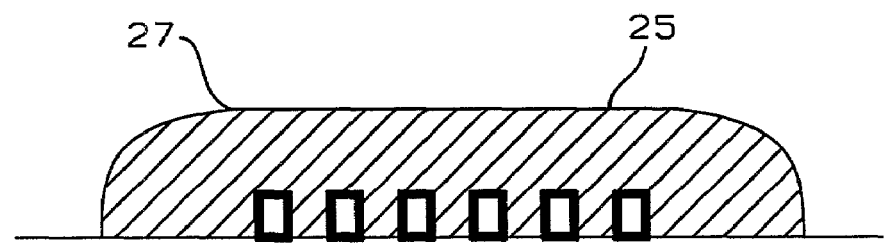

Referring finally to FIG. 3d, there is shown the result of low temperature curing of the resist subsequent to said resist being subjected to the two development steps outlined above. Of particular note is the flattened upper surface (25), which results from the radiative surface curing action of the second I-line exposure. Also of note is the curved apex angle (27), which results, during the hardbake, from the natural flow of the uncured surface portion ((23) in FIG. 3c) of the resist. The low temperature curing process consists of an approximate 30 minute postbake (between approximately 20 and 40 minutes is acceptable) at a temperature of approximately 125° C. (but wherein a temperature range of between approximately 110° and 135° C. is acceptable), followed by 2 hour hardbake (between 1.5 and 2.5 hours is acceptable) at a temperature of approximately 180° C., but which could be in the range of between approximately 160° and 200° C. Note further that in the case of the low temperature curing of a second photoresist layer on which coil formation is not necessarily contemplated, the surface curing produced by the second I-line exposure allows the rear portion (not surface-cured) to form the advantageous steep backside angle (see FIG. 2d) at the backgap which is sufficiently thick to prevent coil-to-yoke shorting.

As is understood by a person skilled in the art, the preferred embodiment of the present invention is illustrative of the present invention rather than limiting of the present invention. Revisions and modifications may be made to methods, materials, structures and dimensions employed in practicing the method of the present invention, while still remaining in accord with the spirit and scope of the present invention as defined by the appended claims.

What is claimed is:

1. A method for achieving shape control of photoresist material when forming coil layers in magnetic write heads, comprising:
   providing a substrate;
   forming on said substrate a first coil layer;
   forming, covering said substrate and said first coil layer, a photoresist layer;
   subjecting said photoresist layer to a softbake process; then
   subjecting said photoresist layer to a first radiative exposure process using a first photomask and a first radiative exposure source;
   following said first radiative exposure process, subjecting said photoresist layer to a development process; then
   subjecting said photoresist layer to a second radiative exposure process using a second photomask and a second radiative exposure source; then
   subjecting said photoresist layer to a thermal curing process, whereby the photoresist, as a result of the aforesaid thermal and radiative exposure processes, now has an upper surface with a steeply curved rear portion, a steeply sloped apex portion and a flat central portion on which a second coil layer may be advantageously formed.

2. The method of claim 1 wherein the photoresist layer is a layer of I-line sensitive photoresist.

3. The method of claim 1 wherein the softbake process consists of baking the photoresist at a temperature between approximately 110° and 135°.

4. The method of claim 3 wherein the softbake process has a time duration of between approximately 330 and 390 seconds.

5. The method of claim 1 wherein the first radiative exposure process is the I-line process that consists of exposing the photoresist material through said first photomask using an I-line stepper at approximately 550 mJ energy.

6. The method of claim 1 wherein said first photomask is configured so as to expose a region of sufficient surface area on which to form a flattened area for the formation of the second coil layer and to leave an apex angle region unexposed.

7. The method of claim 6 wherein the second exposure process uses an I-line stepper and 100 mJ energy applied through the second photomask that permits additional exposure of the flattened area exposed by the first photomask and leaves an apex angle region unexposed.

8. The method of claim 1 wherein the photoresist is developed with an I- line sensitive photoresist developer, using spray development.

9. The method of claim 1 wherein said thermal curing process comprises a postbake process at a temperature range between approximately 110° and 135° C. for a time duration between approximately 20 and 40 minutes, followed by a hardbake process at a temperature between approximately 160° and 200° C. for a time duration between approximately 1.5 and 2.5 hours.

* * * * *